April 23, 1963 R. H. BROWN 3,086,369
UNDERWATER PIPE LINE AND METHOD
Filed Oct. 2, 1961
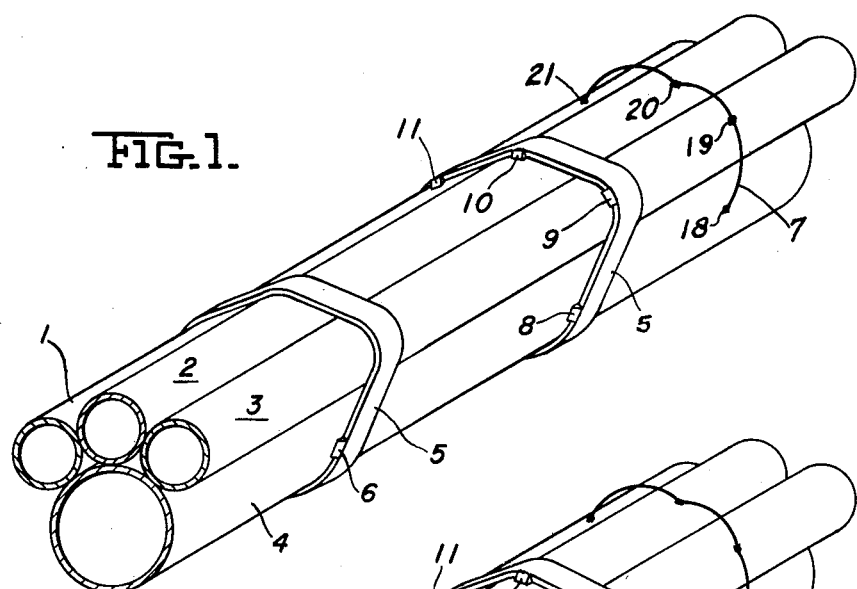
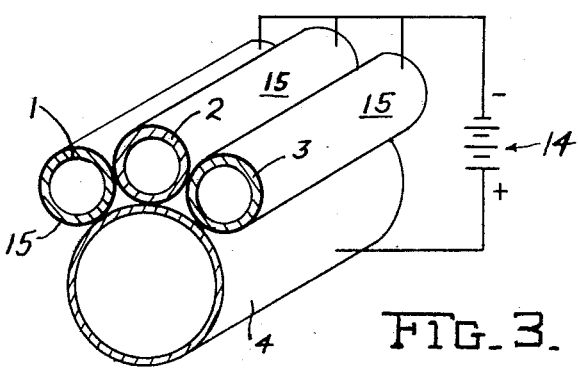
INVENTOR.
ROBERT H. BROWN
BY
Robert T. Tester
ATTORNEY United States Patent Office 3,086,369
Patented Apr. 23, 1963

3,086,369
UNDERWATER PIPE LINE AND METHOD
Robert H. Brown, Natrona Heights, Pa., assignor to Aluminum Company of America, Pittsburgh, Pa., a corporation of Pennsylvania
Filed Oct. 2, 1961, Ser. No. 142,188
10 Claims. (Cl. 61—72.3)

This invention relates to a composite pipe line for underwater anchorage, a composite pipe line anchored under water, and a method of laying such a pipe line. It particularly relates to underwater pipe lines employing metals that may be cathodically protected, such as steel or aluminum alloy pipe lines. An underwater pipe line commonly is launched with floats, and then sunk and anchored with concrete weights attached to the line. Further, such a line is usually cathodically protected against corrosion, either by galvanic anodes spaced along the pipe line or by a driven anode adjacent to it. This invention relates to a novel composite pipe line which is both cathodically protected and anchored in a novel manner.

A general object of the invention is to provide a composite pipe line of two or more pipes, one or more of which is suitable for use as a service pipe and one or more of which is suitable both for cathodically protecting the service pipe or pipes and for anchoring the pipe line when filled or partially filled with ballast.

A particular object of the invention is the novel and efficient use of aluminum alloy pipes in a composite pipe line, but the invention is applicable to pipes of other metals.

The invention will be described with reference to the embodiments thereof shown in the accompanying drawing in which:

FIGURE 1 shows a section of a composite pipe line section before it is laid;

FIGURE 2 shows the composite pipe line section of FIGURE 1 after one of the pipes has been filled with ballast; and FIGURE 3 shows a portion of an alternate ballasted composite pipe line.

The embodiments of the invention shown in the drawing are useful for off-shore oil and gas lines. One advantage of a composite pipe line of either type is that the elements of the composite line can be assembled and joined on shore and then towed into position while floating on water. When brought to desired position, the composite line may be sunk by filling one or more of the pipes with ballast. It may be held submerged when ballast is provided in that pipe which also serves as anode for cathodic protection of the service or product pipe or pipes.

As shown in FIGURE 1 of the drawing, a composite pipe line for underwater anchorage is made up of three metal service pipes 1, 2 and 3, together with at least one additional pipe 4 of metal anodic to the service pipe metal, i.e. metal adapted as a galvanic anode to cathodically protect the service pipe metal in water. The four pipes are arranged in a bundle and are mechanically affixed in parallel relation to each other by several banding strips 5, conveniently tack welded to the anodic pipe 4 as at 6. Tack welding each band 5 to only one of the pipes permits relative axial movement of the pipes, thus accommodating bending or unequal thermal expansion or contraction of the pipes.

Since the additional pipe 4 is intended to cathodically protect the service pipes it is desirable to provide one or more positive electrical connections directly between the anodic metal pipe 4 and each of the service pipes 1, 2 and 3. This may be conveniently effected by using electrical connectors in the form of bands 5 or preferably looped flexible leads 7, tack welded to the pipes 4, 1, 2 and 3 as at 8, 9, 10 and 11 or 18, 19, 20 and 21, respectively. The banding strips 5 tack welded as at 6 are used for mechanically affixing the pipes in parallel relation may well be provided at regular intervals, say every 10', but the electrical connections preferably by way of flexible leads 7 need only be provided at relatively infrequent intervals, say 1000', i.e. at intervals establishing galvanic protective current flow between anode and service pipes when the composite pipe line is anchored under water.

The service pipes 1, 2 and 3 may be made of steel, in which case the anodic pipe 4 would be made of metal anodic to steel, such as zinc or a zinc alloy, magnesium or a magnesium alloy, or aluminum or an aluminum alloy. When the service pipes 1, 2 and 3 are made of an aluminum alloy, the anodic pipe 4 is desirably made of a metal selected from the group consisting of aluminum and aluminum alloys galvanically protective of the service pipe metal in water. Covered or coated service pipes may be employed, if desired.

In a typical installation the product lines, indicated as service pipes 1, 2 and 3, may be made of 6061–T6 aluminum alloy (nominally containing 1.0% magnesium, 0.25% chromium, 0.25% copper and 0.6% silicon, the balance being aluminum and normal impurities), the alloy being in the solution heat treated and artifically aged temper. An alternate composition for the service pipes is 5456 aluminum alloy (nominally containing 5% magnesium and 0.75% manganese, the balance being aluminum and other minor alloying elements and impurities). A typical line may employ 2" Schedule 80 service pipes of alloys such as these, in welded lengths most suitable for launching, e.g. 3600' sections.

The anodic pipe 4 for use with service pipes as above described may conveniently be an aluminum-zinc alloy, such as 7072 (nominally containing 1% zinc, the balance being aluminum and normal impurities). Such a pipe, in the example under discussion, may be a 3" Schedule 10 pipe. Pipes in the foregoing sizes may be readily banded, as indicated in the drawing, with banding strips 5 about ⅛" x ½" in cross section, and of the same alloy as the service pipes. The electrical connections may be made with similar banding strips, or preferably with flexible leads 7.

When a desired length of th ecomposite pipe line has been prepared, the ends of the pipes may be plugged and the composite line may be floated in water into position over its place of anchorage. A composite pipe line as described will float, although other sizes and metals may result in the composite line exhibiting only substantial buoyancy in water. Additional sections may be joined to it, if desired, and the line carried further out over the body of water under which the line is to be anchored. Then the anodic pipe 4 may be opened, and water pumped in, preferably at one end, so as to gradually sink the composite pipe line as it is ballasted by the admission of water. When the composite pipe line has reached its place of anchorage a different ballast may be introduced, if desired, as by pumping in a slurry comprised of Portland cement. The Portland cement will set in the anodic pipe 4, as at 12 in FIGURE 2, and serve therewith as a permanent anchor for the composite pipe line under water. Any suitable ballast may be employed, whether liquid, pulverulent, plastic or solid. The amount will be determined primarily by the weight requirement for adequate anchorage of the composite pipe line. Where desired the anodic pipe 4 could be a bimetal pipe, with an inside liner of metal having better structural characteristics than most anode metals. In the case of the aluminum alloy anodic pipe the inner metal could be of 3003 aluminum alloy (nominally containing 1.2% manganese, the balance being aluminum and normal impurities). In such case the 7072 metal would protect the service lines and also the inner bimetal alloy. Such an arrangement would be especially suitable where a pumpable ballast were employed, so that it could be pumped in for anchoring and pumped out for re-floating the line for repairs or inspection.

In use the anodic pipe 4 functions as an anode to cathodically protect the product or service pipes 1, 2 and 3. It is a continuous anode in the sense that it is co-extensive with the length of service pipes to be protected. Positive electrical connection between the anodic pipe 4 and service pipes 1, 2 and 3 is preferably insured by means of electrical connectors 7. As noted, such connectors may be spaced at substantial intervals.

Another embodiment of the invention is shown in FIGURE 3 (bands 5 being omitted for clarity). Here the covered service pipes 1, 2 and 3 are employed with an additional pipe 4 of the same or different metal which functions as a driven anode. That is to say, the pipe 4 may be made of metal cathodic to the service pipe metal, metal equi-potential with that of the service pipe metal, or metal insufficiently anodic to the service pipe metal to provide adequate protective current flow by galvanic action alone. The metal of additional pipe 4 is made sufficiently anodic to the metal of service pipes 1, 2 and 3 by being electrically connected thereto through a suitable current source 14. The current source (conveniently a generator or rectifier) and electrical connections to the metal pipes are conveniently made at the on-shore end of the composite pipe line, and the service pipes 1, 2 and 3 are insulated from the additional pipe 4 over the lengths to be afforded cathodic protection. One arrangement is to employ non-conducting bands (not welded) and service pipes with non-conducting coverings 15, but other insulating arrangements may be employed.

It will be seen that the composite pipe line in accordance with the invention eliminates the need for employing both separate anchor weights on a pipe line and separate sacrificial anodes spaced along the pipe line. In self-buoying forms, it also eliminates the need for auxiliary floats for launching. When all pipes are empty the anode pipe at least contributes substantially to the buoyancy of the composite pipe line during launching, if it is not in fact self-floating. The anodic pipe 4, together with the ballast 12, thus serves both as a protective anode and as an anchor.

Numerous modifications and alternative arrangements of the composite pipe line as employed in the invention will occur to those skilled in the art.

What is claimed is:

1. A composite pipe line for underwater anchorage comprising
    at least one metal service pipe,
    at least one additional pipe of metal adapted to serve as an anode to cathodically protect said service pipe metal in water, and
    means for electrically connecting said pipes to establish protective current flow therebetween in water,
    said pipes being mechanically affixed in parallel relation to each other,
    said composite pipe line exhibiting at least substantial buoyancy in water when empty, and
    said additional pipe being further adapted upon being at least partially filled with ballast to serve as an anchor for said composite pipe line under water.

2. A composite pipe line in accordance with claim 1 in which there is a plurality of service pipes,
    said composite pipe line is adapted to float in water when empty, and
    said additional pipe is adapted upon being at least partially filled with ballast to sink and anchor said composite pipe line under water even when said service pipes are empty.

3. A composite pipe line in accordance with claim 1 in which said service pipe metal is an aluminum alloy and said additional pipe metal is a metal selected from the group consisting of aluminum and aluminum alloys.

4. A composite pipe line in accordance with claim 1 in which said pipes are mechanically affixed to each other at suitable intervals in a manner allowing relative axial movement thereof.

5. A composite pipe line for underwater anchorage comprising
    at least one metal service pipe,
    at least one additional pipe of metal adapted to serve as a galvanic anode to cathodically protect said service pipe metal in water, and
    means for electrically connecting said pipes at least at intervals to establish galvanic protective current flow therebetween in water,
    said pipes being mechanically affixed in parallel relation to each other,
    said composite pipe line exhibiting at least substantial buoyancy in water when empty, and
    said additional pipe being further adapted upon being at least partially filled with ballast to serve as an anchor for said composite pipe line under water.

6. A composite pipe line in accordance wtih claim 5 in which said service pipe metal is an aluminum alloy and said additional pipe metal is selected from the group consisting of aluminum and aluminum alloys galvanically protective of said service pipe metal in water.

7. A composite pipe line for underwater anchorage comprising
    at least one metal service pipe,
    at least one additional pipe of metal adapted to serve as a driven anode to cathodically protect said service pipe metal in water, and
    means for electrically connecting said pipes through an external current source to establish externally driven protective current flow therebetween in water,
    said pipes being mechanically affixed in parallel relation to and insulated from each other along the length of said service pipe metal to be protected,
    said composite pipe line exhibiting at least substantial buoyancy in water when empty, and
    said additional pipe being further adapted upon being at least partially filled with ballast to serve therewith as an anchor for said composite pipe line under water.

8. A composite pipe line anchored under water comprising
    at least one metal service pipe,
    at least one additional pipe of metal serving as an anode to cathodically protect said service pipe in water, and
    means electrically connecting said pipes to establish protective current flow therebetween in water,
    said pipes being mechanically affixed in parallel relation to each other,
    said composite pipe line exhibiting at least substantial buoyancy in water when empty, and
    said additional pipe being at least partially filled with ballast to serve as an anchor for said composite pipe line under water.

9. A composite pipe line anchored in accordance with claim 8 in which said ballast comprises Portland cement.

10. A method of laying a composite underwater pipe line comprising providing at least one metal service pipe, providing at least one additional pipe of metal adapted to serve as an anode to cathodically protect said service pipe metal in water, electrically connecting said pipes to establish protective current flow therebetween in water, said pipes being mechanically affixed in parallel relation to each other, floating said composite line into position over its place of anchorage under water, sinking said composite line to its place of anchorage under water, and there permitting said additional pipe when at least partially filled with ballast to serve as an anchor for said composite pipe line under water.

No references cited.